(12) United States Patent
Zhao et al.

(10) Patent No.: US 11,686,942 B2
(45) Date of Patent: Jun. 27, 2023

(54) POLARIZATION-BASED PROCESSING OF UNPOLARIZED IMAGE LIGHT

(71) Applicant: Meta Platforms Technologies, LLC, Menlo Park, CA (US)

(72) Inventors: Yang Zhao, Kirkland, WA (US); Afsoon Jamali, Redmond, WA (US); Junren Wang, Redmond, WA (US); Wai Sze Tiffany Lam, Redmond, WA (US); Lu Lu, Kirkland, WA (US); Douglas Robert Lanman, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 543 days.

(21) Appl. No.: 16/730,293

(22) Filed: Dec. 30, 2019

(65) Prior Publication Data

US 2021/0080720 A1 Mar. 18, 2021

Related U.S. Application Data

(60) Provisional application No. 62/899,431, filed on Sep. 12, 2019.

(51) Int. Cl.
| | | |
|---|---|---|
| *G02F 1/137* | (2006.01) | |
| *G02B 27/01* | (2006.01) | |
| *G03B 13/36* | (2021.01) | |

(52) U.S. Cl.
CPC ..... *G02B 27/0172* (2013.01); *G02F 1/13718* (2013.01); *G03B 13/36* (2013.01)

(58) Field of Classification Search
CPC .................................................. G02F 1/13718
See application file for complete search history.

(56) References Cited

U.S. PATENT DOCUMENTS

| | | |
|---|---|---|
| 8,786,759 B2 | 7/2014 | Wang et al. |
| 10,379,419 B1 | 8/2019 | Lu et al. |
| 10,451,885 B2 | 10/2019 | Lu et al. |

(Continued)

FOREIGN PATENT DOCUMENTS

| | | |
|---|---|---|
| WO | 2017160367 | 9/2017 |
| WO | 2018065975 | 4/2018 |

OTHER PUBLICATIONS

International Preliminary Report on Patentability for International Application No. PCT/US2020/045536, dated Mar. 24, 2022, 10 pages.

(Continued)

*Primary Examiner* — Edmond C Lau
(74) *Attorney, Agent, or Firm* — Pequignot + Myers; Matthew A. Pequignot

(57) ABSTRACT

A display system includes a source of unpolarized image light, and a stack of polarization-selective optical elements operable to switchably convert the unpolarized image light into two orthogonally polarized light beams, each of which being switchable in at least one beam characteristic. An output polarizer selects one of the two orthogonally polarized light beams for providing to a user. A depolarizer may be disposed between an electronic display emitting polarized light and the stack. The depolarizer may be in the form of an LC bilayer with randomized in-plane optic axis.

15 Claims, 13 Drawing Sheets

(56) References Cited

U.S. PATENT DOCUMENTS

| | | |
|---|---|---|
| 10,451,947 B1 | 10/2019 | Lu et al. |
| 2018/0129018 A1 | 5/2018 | Cheng et al. |
| 2019/0075281 A1 | 3/2019 | Hall et al. |
| 2019/0107719 A1 | 4/2019 | Edwin et al. |
| 2019/0123831 A1 | 4/2019 | Gaubatz |
| 2019/0227215 A1 | 7/2019 | Danziger et al. |
| 2019/0227492 A1 | 7/2019 | Kroll et al. |
| 2019/0265477 A1* | 8/2019 | Perreault ............. G02B 27/14 |
| 2019/0318706 A1 | 10/2019 | Peng et al. |

OTHER PUBLICATIONS

PCT/US2020/045536 PCT Search Report dated Oct. 22, 2020.
Hasman Erez et al., " Polarization dependent focusing lens by use of quantized Pancharatnam-Berry phase diffractive optics", Applied Physics letters, AIP Publishing LLC, vol. 82, No. 3, Jan. 20, 2003, pp. 328-330.
Guanjun Tan et al., "Foveated imaging for near-eye displays", Optics Express, vol. 26., No. 19, Sep. 11, 2018, p. 25076.
Achromatic diffraction from polarization gratings with high efficiency, Chulwoo Oh and Michael J. Escuti, Optics Letters / vol. 33, No. 20 / Oct. 15, 2008, 2287-2289.
Liquid crystal depolarizer based on photoalignment technology, Bing-Yan Wei et al., Photon. Res. / vol. 4, No. 2 / Apr. 2016, 70-73.
Monochromatic Depolarizer Based on Liquid Crystal, Pawef Marc et al. Crystals 2019, 9(8), 387.

* cited by examiner

US 11,686,942 B2

POLARIZATION-BASED PROCESSING OF UNPOLARIZED IMAGE LIGHT

REFERENCE TO RELATED APPLICATION

The present application claims priority from U.S. Provisional Patent Application No. 62/899,431 filed on Sep. 12, 2019, entitled "Depolarizer for Near Eye Display", and incorporated herein by reference in its entirety.

TECHNICAL FIELD

The present disclosure relates to display devices, and in particular to near-eye displays and components thereof.

BACKGROUND

Head mounted displays (HMD), helmet mounted displays, near-eye displays (NED), and the like are being used increasingly for displaying virtual reality (VR) content, augmented reality (AR) content, mixed reality (MR) content, and they are finding applications in diverse fields including entertainment, education, training and biomedical science, to name just a few examples. The VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment. One or more varifocal lenses may be used to dynamically adjust the focused image location for each eye, e.g. to reduce a discrepancy between eye vergence and visual distance accommodation known as vergence-accommodation conflict.

Compact display devices are desired for head-mounted displays. Because a display of HMD or NED is usually worn on the head of a user, a large, bulky, unbalanced, and/or heavy display device would be cumbersome and may be uncomfortable for the user to wear. In order to reduce the size and/or weight of the HMD or NED, polarization-based optics using thin liquid crystal (LC) layers and stacks may be used to implement lenses and other light processing devices.

BRIEF DESCRIPTION OF THE DRAWINGS

Exemplary embodiments will now be described in conjunction with the drawings, in which like elements are indicated with like reference numerals, which are not to scale, and in which.

DETAILED DESCRIPTION

Figure 1:
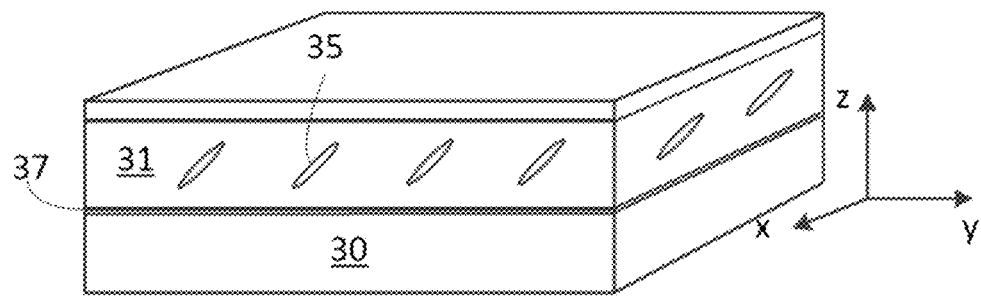
FIG. 1 is a schematic perspective view of a liquid crystal (LC) polarization device.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. The terms "NED" and "HMD" may be used herein interchangeably to refer to head-wearable display devices capable of providing VR/AR/MR content to the user.

An aspect of the present disclosure relates to an optical depolarizer and its use in a display system. In some implementations the display system may be configured to be mounted upon a user's head for near-eye display of images.

An aspect of the present disclosure relates to a display system comprising a stack of polarization-selective optical elements, the stack comprising one or more switchable polarization-selective elements, the stack configured to operate on unpolarized image light in the absence of input polarizer to output two orthogonally polarized light beams having switchable beam characteristics. The stack may be followed by a clean-up polarizer for selecting one of the two orthogonally polarized beams with a desired beam characteristic for forming an image.

In some implementations the stack comprises a sequence of liquid crystal (LC) Pancharatnam-Berry phase (PBP) optical elements, each paired with a switchable LC HWP. In some implementations at least one of the polarization-selective elements of the stack comprises a passive or a switchable LC PBP optical element. In some implementations the stack comprises multiple layers having a polarization-selective optical property, wherein orthogonal polarizations are differently processed and both passed to a next layer. In some implementations the stack comprises multiple LC layers. In some implementations the stack comprises a sequence of LC PBP lenses of differing nominal optical power. In some implementations the stack comprises one or more LC PBP lenses and one or more active LC waveplates, wherein at least one of the LC PBP lenses is disposed to receive unpolarized light. In some implementations the stack comprises one or more LC PBP gratings and one or more active LC waveplates, wherein at least one of the LC PBP gratings is disposed to receive unpolarized light. In some implementations the stack comprises, or is followed by, a clean-up polarizer.

An aspect of the present disclosure relates to a display system comprising: a source of unpolarized image light; a stack of polarization-selective optical elements disposed to receive the unpolarized image light and operable to switchably convert the unpolarized image light into two orthogonally polarized light beams; and, an output polarizer disposed to receive the two orthogonally polarized light beams and configured to select one of the two orthogonally polarized light beams for forming an image. Each of the two orthogonally polarized light beams may be switchable in at least one beam characteristic. In some implementations the at least one beam characteristic may comprise a beam convergence characteristic. In some implementations the at least one beam characteristic may comprise a beam deflection angle. The display system may be configured to be mounted upon a user's head for near-eye display of images.

In some implementations the stack may comprise one or more Pancharatnam-Berry phase (PBP) optical elements, wherein at least one of the one or more PBP optical elements is disposed to receive the unpolarized image beam. In some implementations one or more Pancharatnam-Berry phase (PBP) optical elements may be switchable. In some implementations one or more PBP elements may each be directly followed by a switchable HWP. In some implementations the one or more PBP optical elements may comprise a plurality of PBP lenses of differing nominal optical power, and the stack may be configured to operate as a vary-focal lens. In some implementations the plurality of PBP lenses may comprise a liquid crystal (LC) PBP lens switchable to a neutral state lacking optical power. In some implementations the stack may comprise a plurality of switchable half-wave plates (HWP). In some implementations the PBP lenses may be sequentially paired with the switchable HWPs; in some implementations each of the switchable HWPs may directly follow one of the PBP lenses. In some implementations the one or more PBP optical elements may comprise a polarization grating. In some implementations the polarization grating may be directly followed by a switchable HWP. In some implementations the polarization grating may comprise an LC PBP grating switchable to a non-diffracting state.

In some implementations the source of unpolarized image light comprises an electronic display configured to emit unpolarized light. In some implementations the source of unpolarized image light comprises an electronic display configured to emit polarized image light, and a depolarizer disposed between the electronic display and the stack. In some implementations the polarized image light is linearly polarized, and the depolarizer comprises a half-wave plate (HWP) with a randomized in-plane optic axis. In some implementations the depolarizer may be disposed adjacent to the electronic display.

In some implementations of the display system the depolarizer comprises a birefringent layer with an in-plane optic axis which orientation varies randomly or pseudo-randomly from one location to another in the plane of the birefringent layer, a property that may be referred to as a randomized in-plane optic axis. In some implementations the birefringent layer has a retardance that is substantially constant across the waveplate. In some implementations the birefringent layer has a half-wave optical retardance. In some implementations the orientation of the in-plane optic axis varies randomly or pseudo-randomly along the birefringent layer. In some implementations the birefringent layer comprises LC material. In some implementations the birefringent layer comprises twisted nematic LC material. In some implementations the birefringent layer comprises a plurality of homogenous area segments each having an optic axis, wherein the orientation of the optic axis changes randomly or pseudo-randomly between adjacent area segments. In some implementations the depolarizer comprises a bilayer of twisted LC material, the bilayer comprising two layers of opposite chirality. In some implementation each of the two layers of the bilayer has a half-wave retardance.

An aspect of the present disclosure provides a method for polarization-based processing of image light in a display system, the method comprising: sequentially passing unpolarized image light through a plurality of polarization-selective optical elements to obtain two orthogonally polarized light beams, each of which being switchable in at least one beam characteristic; and, using an optical polarizer disposed downstream of the plurality of polarization-selective optical elements to select one of the orthogonally polarized light beams as an output light beam. In some implementations the method may comprise passing polarized image light from an electronic display through a depolarizer to obtain the unpolarized image light for providing to the sequence polarization-selective optical elements. In some implementations the sequentially passing unpolarized image light may comprise passing the unpolarized image light through a sequence of PBP lenses of different nominal optical powers. In some implementations the sequentially passing unpolarized image light may comprise passing the unpolarized image light through a sequence of LC polarization gratings.

An aspect of the present disclosure relates to a method of fabricating a depolarizer comprising exposing an alignment layer that comprises a photosensitive material to polarized UV light, so that adjacent areas of the alignment layer are exposed to the polarized UV light of different polarization direction. In some implementations the method may comprise exposing a plurality of area segments of the alignment layer to the polarized UV light so that the polarization of the UV light changes randomly or pseudo-randomly when exposing adjacent area segments. An LC material may then be deposited onto the exposed alignment layer to a target thickness to obtained an LC layer having a randomized LC director orientation. In some implementations the target thickness corresponds to a half-wave retardance. The method may include polymerizing the LC material after the depositing to obtain an LC layer with a fixed randomized LC director orientation.

An aspect of the present disclosure relates to a depolarizer comprising a birefringent layer with a spatially varying orientation of an in-plane optic axis. In some implementations the orientation of the in-plane optic axis varies randomly or pseudo-randomly along the birefringent layer. In some implementations the birefringent layer has a retardance that is substantially constant across the waveplate. In some implementations the birefringent layer has a half-wave optical retardance. In some implementations the birefringent layer comprises LC material. In some implementations the birefringent layer comprises twisted nematic LC material. In some implementations the birefringent layer comprises a plurality of homogenous area segments, wherein the orientation of the optic axis changes randomly or pseudo-randomly between adjacent area segments. In some implementations the birefringent layer of the depolarizer is a bilayer comprised of two layers of twisted LC material of opposite chirality.

An aspect of the present disclosure provides a depolarizer comprising: a substrate; a bilayer of a twisted LC material disposed over the substrate, the bilayer comprising: a first layer of the twisted LC material disposed over the substrate, the first layer having an LC director with a first sense of twist in a thickness direction, wherein the thickness direction is normal to the substrate; and a second layer of the twisted LC material disposed over the first layer, the second layer having an LC with a second sense of twist in the thickness direction, wherein the second sense of twist is opposite to the first sense of twist. The LC director of the first layer at an interface with the second layer has a direction that varies randomly or pseudo-randomly in a plane of the substrate. The bilayer may have a half-wave retardance that is generally constant in the plane of the substrate. In some implementations, the first layer and the second layer of the bilayer may have LC twist parameters optimized for broadband operation.

With reference to FIGS. 1-4, embodiments described herein may utilize liquid crystal (LC) based devices that operate in a polarization-sensitive manner without substantially discriminating between orthogonal polarizations in transmitted optical power. Such devices include, but are not limited to, LC PBP lenses, LC PBP gratings, and LC polarization switches. Referring first to FIG. 1, LC devices described herein may be in the form of, or include, an LC layer 31, which may be supported by a transparent or reflective substrate 30. Substrate 30 may be flat or curved. The polarization properties of such devices may depend on the material properties of the LC layer 31, orientation of LC molecules 35 within the layer, the chirality of the LC molecules 35, the thickness of the LC layer 31, and the wavelength λ of incident light. A predominant orientation of the LC molecules at any location (x,y,z) in the LC layer may be conveniently represented by a unit vector n(x,y,z) termed an LC director, n(x,y,z)=−n(x,y,z). Here a Cartesian coordinate system (x,y,z) is used for convenience in which the (x,y) plane is parallel to the plane of the LC layer 31. Within the LC layer 31 the orientation of the LC director may be defined at least in part by an alignment layer or layers 37 that may be disposed immediately adjacent to the LC layer 31. An LC device in which the orientation of LC molecules is generally uniform across the LC layer may operate as a waveplate retarder. For incident light of a specific polarization, an LC device in which the orientation of the LC director varies in the plane of the layer may function, non-exclusively, as a lens, as a grating, or as a de-polarizer as described below, depending on the LC director orientation pattern.

An LC device may be active, where the LC material orientation is electrically controlled, or passive, where the LC material orientation is fixed in place via material properties, for example by the alignment layers and/or by a polymer mixed into the LC fluid and cured at a particular orientation within the LC layer.

Figure 2:
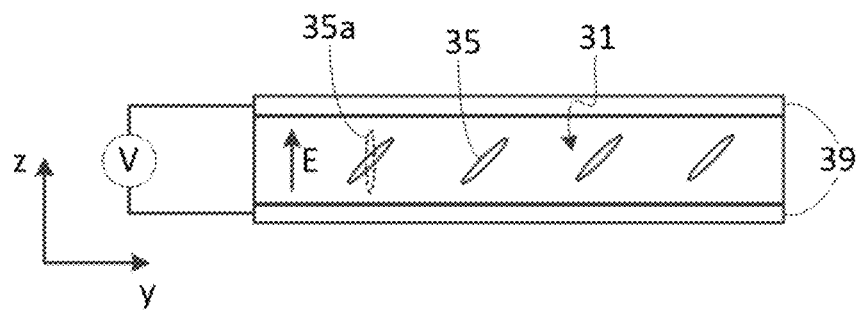
FIG. 2 is a schematic cross-sectional view of an electrically controlled active LC device.

Referring to FIG. 2, an active LC device may be constructed with the LC layer 31 sandwiched between two electrodes 39, at least one of which is transparent in the wavelength range of intended operation. In embodiments operating in transmission, both electrodes 39 may be optically transparent. Transparent electrodes 39 may for example be in the form, or include, ITO (indium tin oxide) layers. In the absence of voltage between the electrodes, the LC molecules 35 may be oriented in a default pattern that imposes desired birefringence properties on the device, for example a desired uniform or non-uniform retardance. Applying a sufficient voltage V between the electrodes 39 may reversibly re-align LC molecules 35 in a way that changes birefringent properties of the LC layer. For example, in some LC materials applying a sufficient voltage V to the electrodes 39 may align the LC molecules along the electric field, as indicated at 35a in the figure, so that the LC layer 31 will lose its birefringence for light at normal or close to normal incidence. An example of an active LC device is an active waveplate which retardance may be switched off and back on by applying a voltage V and by turning the voltage off, respectively. For example, an active LC device may be constructed to provide a retardance of a half-wave plate (HWP) in the absence of applied voltage, and substantially zero retardance when a sufficient voltage V is applied. One or more embodiments described herein may utilize such switchable HWPs, hereinafter referred to as s-HWP, as a polarization switch for polarized light. For example a suitably oriented s-HWP may reverse the chirality of circular polarized (CP) light incident thereon in the absence of voltage (OFF state), and may leave the incident polarization state unchanged in the presence of voltage (ON state). The relationship between the applied voltage and the polarization action of an LC waveplate may be reversed in other embodiments.

Figure 3A:
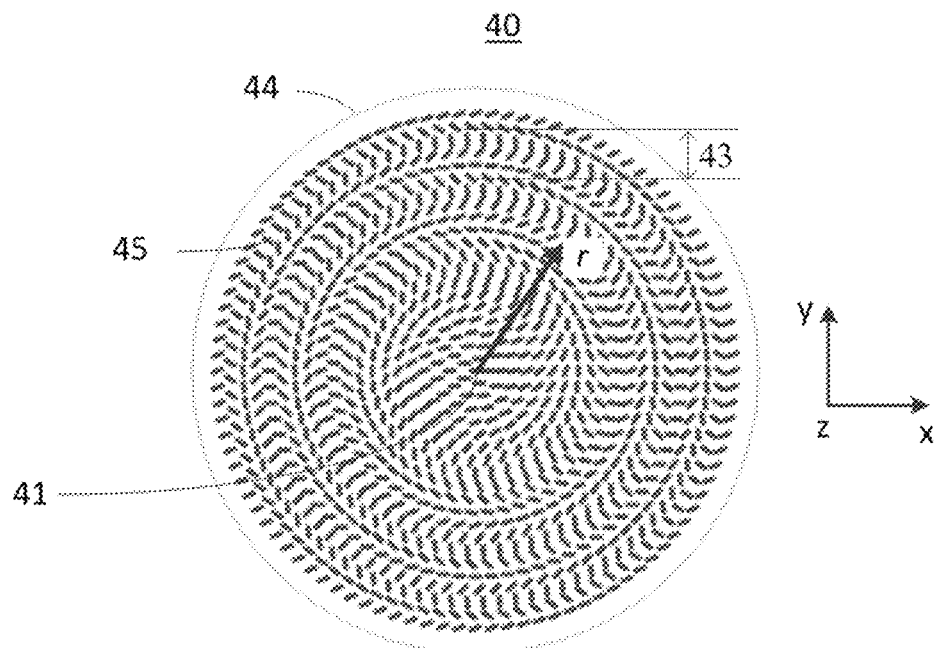
FIG. 3A is a schematic diagram illustrating example liquid crystal orientations in the plane of the LC layer of an LC PBP lens.

Referring to FIG. 3A, a Pancharatnam-Berry phase (PBP) lens 40 with desired polarization processing and focusing properties may be fabricated with the orientation of LC molecules 45 radially varying in plane of the LC layer and, possibly also in in the direction normal thereto, i.e. relative to an optical axis of the LC device (z-axis in FIGS. 1-4). The LC azimuth angle θ, i.e. the angle of rotation of a projection of the LC director onto the plane (x,y) of the LC layer, may vary radially from a center 41 to an edge 44 of the lens 40, with a varied pitch 43 Λ. The pitch Λ indicates a distance across which the azimuth angle θ of the LC director is rotated by 180°, and may be a function of the radial distance r from the center 41 of the PBP lens. Polarized light beam passing through such lens experiences radius-dependent retardation that adds a varying phase shift across the beam's wavefront, resulting in a lensing action for a suitably selected profile of the LC orientation. In some embodiments the azimuth angle θ of the LC orientation in the PBP LC lens 40 may vary in accordance with the equation $$\theta(r) = \frac{\pi r^2}{2 f_0 \lambda_0}$$

where $f_0$ corresponds to the focal length of the PBP lens 40, and $\lambda_0$ corresponds to the wavelength of incident light on the lens. In other embodiments the tilt angle φ of the LC molecules of an PBP lens, i.e. the angle describing the molecules' tilt relative to the optical axis of the lens, may be radially varying to provide a desired phase profile. Such a lens may be either active, where the LC material orientation is electrically controlled, or passive, where the LC material orientation is fixed in place via material properties and/or alignment layers. An active LC PBP lens may be constructed as described hereinabove with reference to FIG. 2. For example, optical power and polarization switching property of an active LC PBP lens may be turned off by applying a suitable voltage across the LC layer to switchably align the LC molecules along the optical axis of the lens (z-axis). The state of an active LC PBP lens in which it has a substantially zero optical power, or an optical power that is smaller than a threshold value, may be referred to as a neutral state. The state of an active LC PBP lens in which it has a desired non-zero nominal optical power may be referred to as a non-neutral state.

Figure 3B:
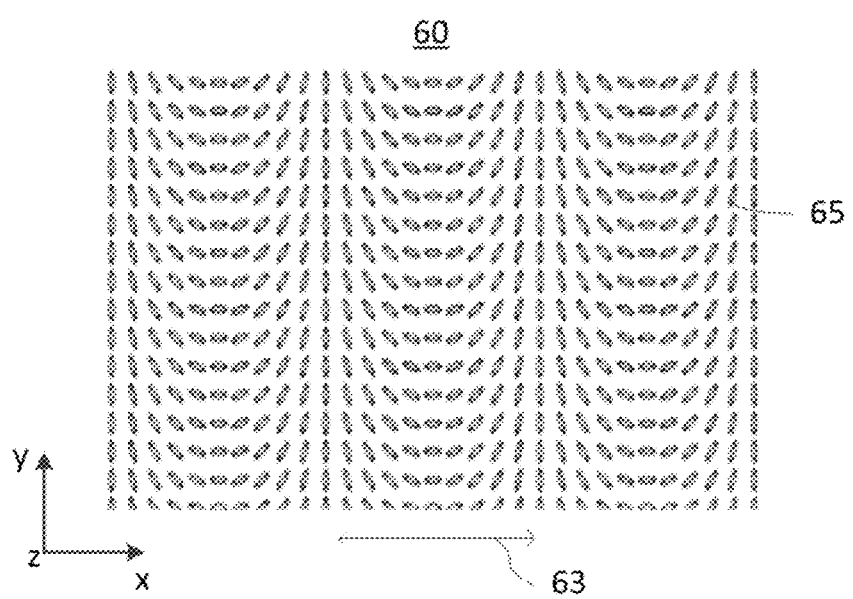
FIG. 3B is a schematic diagram illustrating example liquid crystal orientations in the plane of the LC layer of an LC PBP grating.

Referring to FIG. 3B, an LC device 60 in which the orientation of the LC director varies periodically or nearly periodically in one dimension (1D) along a specific direction in the plane of the LC layer may function as a polarization grating. A polarization grating may direct incident light at an angle that depends on the grating's pitch and a polarization state of the incident light. One example of an LC polarization grating is a PBP grating, in which grating 'groves' are formed by spatially varying birefringence in the plane of the grating. The LC director, which in the figure is represented by "LC molecules" 65, in such grating varies its orientation in the plane of the LC layer, indicated in the figure as an (x,y) plane, defining a device birefringence profile in the plane of the LC layer. The azimuth angle θ of the LC director 65 in the plane of the grating continuously changes from one edge to the other, typically with a fixed pitch 63. An LC PBP grating may be either active, where the LC material orientation is electrically controlled, or passive, where the LC material orientation is fixed in place via material properties and/or alignment layers. An active LC PBP grating may be constructed as described above with reference to FIG. 2, so that its diffractive power may be switched OFF.

Figure 4A:
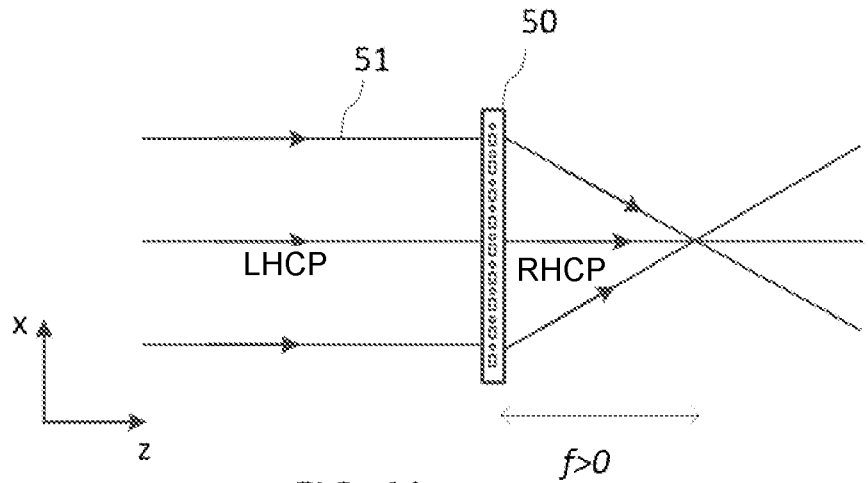
FIG. 4A is a schematic diagram illustrating the operation of an example PBP lens for RHCP light.
Figure 4B:
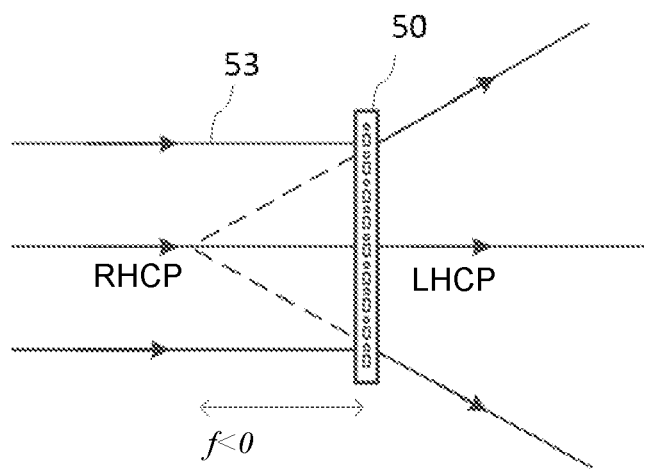
FIG. 4B is a schematic diagram illustrating the operation of an example PBP lens for LHCP lightly.

FIGS. 4A and 4B illustrate the operation of an example PBP lens 50, with a focal length f, for left-handed circular polarized (LHCP) light (FIG. 4A) and right-handed circular polarized (RHCP) light (FIG. 4B). In this example, PBP lens 50 has a positive optical power for LHCP light while switching its polarization to RHCP, and a negative optical power for RHCP light while switching its polarization to LHCP. Thus a collimated LHCP beam 51 exits the lens as a converging RHCP beam that converges to a focus at a distance f from the lens, while a collimated RHCP beam 53 exits the lens as a divergent LHCP beam that appears to diverge from a virtual focus at a distance −f from the lens. The focal length f of the PBP lens defines its nominal optical power 1/f.

Figure 5:
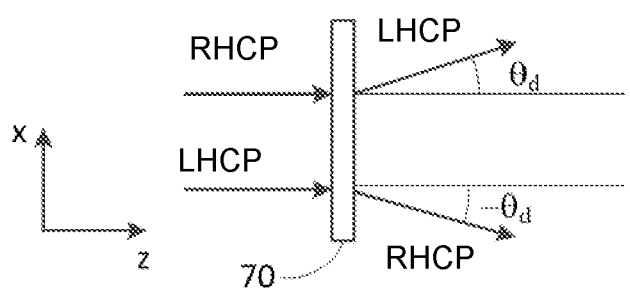
FIG. 5 is a schematic diagram illustrating the operation of a PBP grating for RHCP and LHCP light.

Referring to FIG. 5, a PBP grating 70 may be configured to deflect RHCP light by a diffraction angle $\theta_d$ in one direction, and to deflect LHCP light in an opposite direction, generally by the same diffraction angle $\theta_d$. In both cases the PBP grating 70 switches the circular polarization to its orthogonal polarization. The pitch of an LC PBP grating may be configured to provide a desired magnitude of the diffraction angle $\theta_d$. Such a grating may be either active, where the LC material orientation is electrically controlled, or passive, where the LC material orientation is fixed in place via material properties and/or alignment layers. An active LC PBP grating may be constructed as described hereinabove with reference to FIG. 2. For example, an active LC PBP grating may deflect incident CP light by the diffraction angle $+\backslash-\theta_d$ depending on the chirality of incident light while simultaneously reversing its chirality in the absence of voltage (OFF state), and may leave both the direction of propagation and the polarization state of incident light unchanged in the presence of voltage (ON state). A PBP grating is an example of a polarization grating. Another example of a polarization grating is a volume holographic LC grating, in which the orientation of the LC layer material may vary both in the plane of the LC layer and in the direction normal to the LC layer, which may be referred to as the thickness direction. Such gratings may be constructed to selectively deflect only one of two orthogonal linear polarizations, without substantially changing the propagation direction of the other of the two orthogonal polarizations. The volume holographic LC grating may operate, for example, as an active element where the LC material is electrically controlled, and/or as a passive element, together with a linear polarizer and an active polarization rotator operable to switch the polarization status of the incident light. Embodiments described below with reference to LC PBP gratings may be modified to use such volume holographic LC gratings instead.

Figure 6:
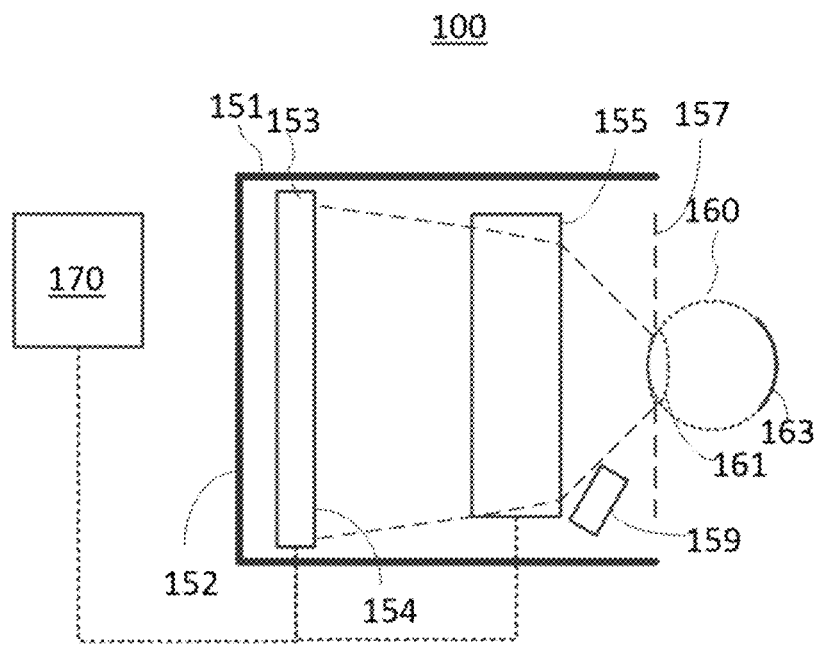
FIG. 6 is a schematic side cross-sectional view of a virtual reality (VR) HMD with an optical block focusing image light for the user.

Referring now to FIG. 6, there is schematically illustrated, in a partial cross-section, an example HMD 100 in which stacks of active and/or passive LC devices such as those described above can be used. HMD 100 includes an electronic display 153 disposed at a frontal side 152 of a rigid body 151, facing an eyebox 157. The eyebox 157 defines the position of an eye 160 of the user when the user wears HMD 100. An optics block 155, which is disposed in an optical path between the electronic display 153 and the eyebox 157, transmits image light from the electronic display 153 to the eyebox 157. In one or more embodiments the optics block 155 may form a magnified virtual image of the pixelated light-emitting face 154 of the electronic display 153, typically farther away from the eyebox 157 than the electronic display 153. The virtual image of the light-emitting face 154 of the display is then projected by a lens 161 of the eye 160 onto a retina 163 to form an image thereon. Although only a single optics block 155 is shown, the HMD 100 may include two instances of this block, one for each eye of the user, and may also include two instances of the electronic display 153. The electronic display 153 may be a pixelated display, for example, a micro-display with a total pixel count that may be smaller than, for example, a pixel count of a conventional direct-view LED TV display. HMD 100 may also include various other elements, such as one or more positions sensors, one or more locators, an inertial measurement unit (IMU), and so forth, which may be coupled to the rigid body 151, and in some instances may be at least in part positioned at the frontal side 152 thereof. In one or more embodiments HMD 100 may include one or more cameras 159, which may be configured for eye tracking and/or display calibration, and may be disposed downstream of the optics block 155. The camera(s) 159 may also be disposed upstream the optics block, or be integrated into the optics block 155. The electronic display 153 may be, for example, an LCD display, an OLED display, an AMOLED display, or any other suitable display. In some embodiments the electronic display 153 may be configured to emit polarized light. In other embodiments the electronic display 153 may be configured to emit unpolarized light. The electronic display 153 may be operationally coupled to a display processor 170. In operation, the electronic display 153 receives image or video data from processor 170, for example in the form of a sequence of input image frames, and presents corresponding images to the user. The optics block 155 may include one or more optical elements, such as but not exclusively a convex lens, a concave lens, a Fresnel lens, an LC lens, a liquid lens, a pancake lens, an aperture, a grating, a filter, a polarizer and/or polarization converter, or any other suitable optical element. The optics block 155 may be configured to form a magnified image of the light-emitting face 154 of the electronic display 153, or an area thereof, and may also correct for optical aberrations and other optical errors in the image light received from the electronic display 153.

In some embodiments display 100 may use a varifocal lens which optical power may be dynamically adjusted to enhance user's experience. In some embodiments the varifocal lens may cooperate with the eye tracking system of HMD 100 to dynamically vary focusing properties of the HMD optics to improve user's experience. In some embodiments a varifocal lens may be constructed by stacking several PBP lenses of differing optical powers, which in some embodiments may be interspersed with s-HWPs. By suitably selecting the optical powers of the PBP lenses, such a multi-element or multi-layer LC PBP lens stack may be controlled to provide a range of optical power with a step defined by the smallest-power lens.

Figure 7:
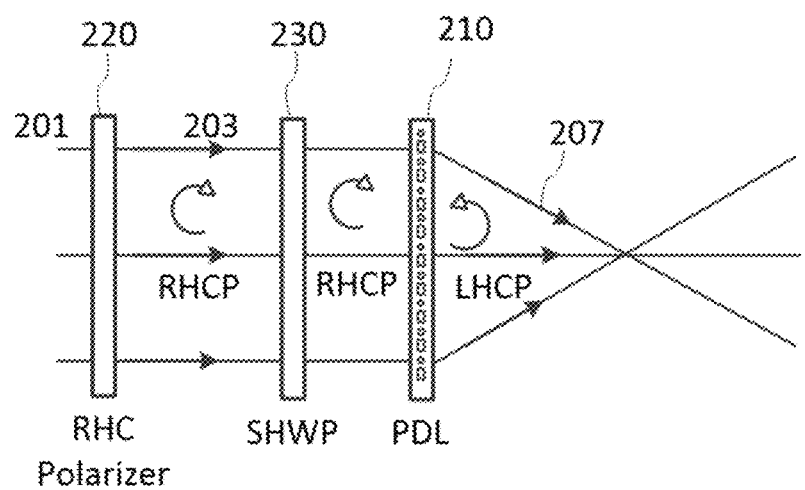
FIG. 7 is a schematic diagram illustrating the operation of a PBP lens in cooperation with a switchable HWP.

FIG. 7 schematically shows an example PBP lens system having optical power switchable between +D1 and −D1 diopters (D). In the illustrated embodiment it includes a circular polarizer (CPr) 220 followed by an s-HWP 230 followed by a PBP lens 210 of a nominal optical power D1. CPr 220 may be for example RHC polarizer configured to convert input polarized or non-polarized light 201 to RHCP light 203. When s-HWP 230 is in the ON state, it transmits the RHCP light 203 therethrough without a polarization change, so that PBP lens 210 acts upon the RHCP light 203 as a focusing lens with the optical power +D1, outputting converging LHCP beam 207. When S-HWP 230 is in the OFF state, it changes the beam polarization to the orthogonal one, sending LHCP light to PBP lens 210. PBP lens 210 acts upon the LHCP light as a de-focusing lens with the optical power (−D1), outputting diverging RHCP beam. Thus, an assembly of a PBP lens in sequence with an s-HWP operates for CP light as a switchable ±D1 lens. In some embodiments the PBP lens 210 may be active, and electrically switchable to a state with zero, or nearly zero, optical power, increasing the number of switchable optical power states. Stacking such two-element assemblies with different values of D1, for example D1, D½, D¼, etc. provides a multi-state varifocal lens.

Figure 8:
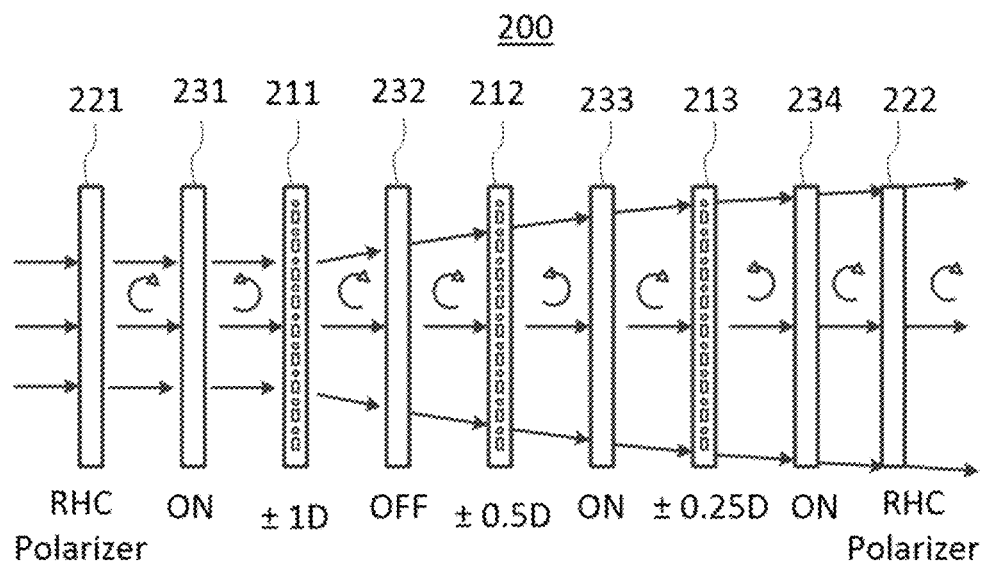
FIG. 8 is a schematic diagram illustrating the operation of a varifocal lens formed as a switchable PBP stack with the first PBP element receiving polarized light.

FIG. 8 illustrates such a switchable LC stack that includes three PBP lenses 211, 212, and 213 with nominal optical powers of 1 D, 0.5 D, and 0.25 D, as an example. The first PBP lens 211 is preceded by an RHC polarizer 221 and a first s-HWP 231. A second s-HWP 232 is disposed between the first PBP lens 211 and the second PBP lens 212, and a third s-HWP 233 is disposed between the second PBP lens 212 and the third PBP lens 213, which may be followed by a fourth s-HWP 234 and a clean-up RHC polarizer 222. This arrangement is switchable between 8 focal distances corresponding to −1.75 D, −1.25 D, −0.75 D, −0.25 D, 0.25 D, 0.75 D, 1.25 D, and 1.75 D. In embodiments with active PBP lenses which optical power may be switched off, the optical power of the stack may be stepped with a 0.25 D step from −1.75 D to +1.75 D. Other arrangements with a different, for example greater, number of PBP lenses may also be used. Increasing the number of PBP lenses enables broadening the adjustable focal length range and/or decreasing the step in which the focal length may be adjusted. In some embodiments, for example where some of the PBP lenses are active, the number of PBP lenses may exceed the number of s-HWPs in the stack.

Figure 9:
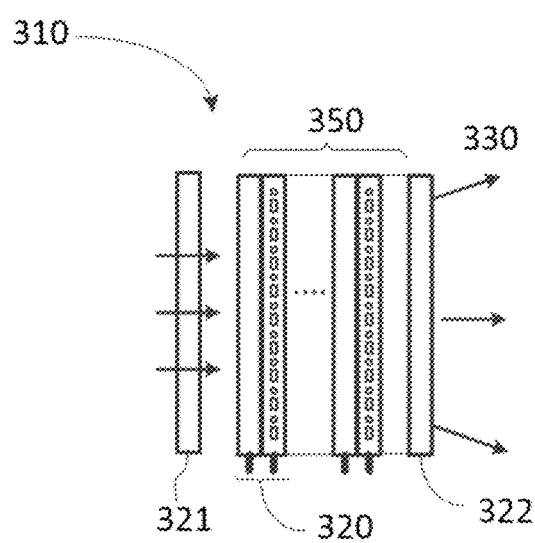
FIG. 9 is a schematic diagram illustrating an integrated implementation of the switchable PBP stack of FIG. 8.

The varifocal lens stack 200, which is shown in FIG. 8 in an expanded view, includes three LC PBP lenses by way of example. Generally a varifocal lens stack of the type shown in FIG. 8 may include any number N≥1 of PBP lenses, at least some of which preceded or followed by an s-HWP for switching. Elements of the stack may be sequentially laminated on a common surface or carrier, with sequential elements optionally sharing a substrate, to provide an integrated LC stack, as illustrated in FIG. 9. A PBP lens preceded or followed by an s-HWP may be referred to as a switchable lens pair or a switchable lens unit.

FIG. 9 illustrates an example embodiment in which N≥2 switchable lens pairs 320 of a switchable LC stack 310 are sequentially laminated to form a varifocal LC block 350, which may be sandwiched between two CP polarizers 321 and 322. In some embodiments the input CP polarizer 321 may be commonly laminated to be a part of the varifocal LC block 350, or may be a separate element, for example laminated upon a light-emitting face of an electronic display.

Figure 10:
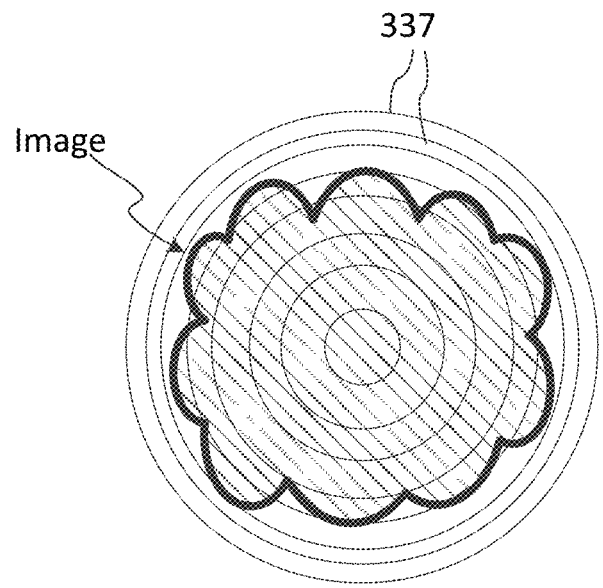
FIG. 10 is a schematic diagram illustrating ring artifacts that may appear in a display using the switchable PBP stack of FIG. 8 operating on polarized image light.
Figure 11:
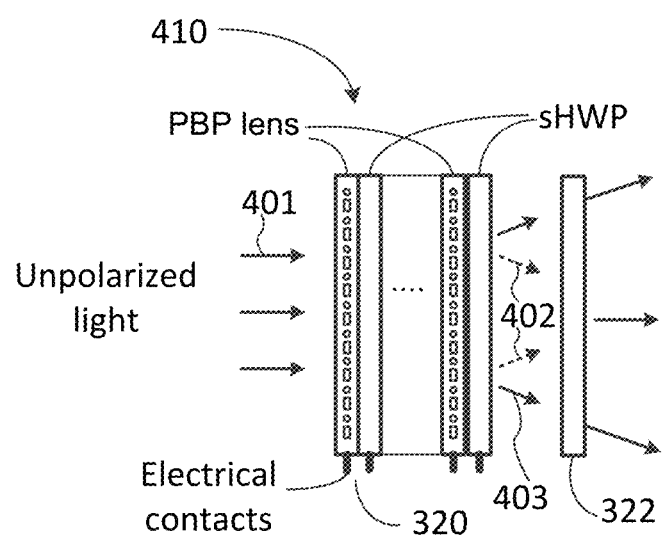
FIG. 11 is a schematic cross-sectional view of a switchable PBP stack for operating with unpolarized incident light.

Referring to FIG. 10, we noticed that when a switchable LC stack of the type illustrated in FIG. 8 or 9 is used in an HMD to provide dynamically adjustable focal distance, such as within the optical block 155 of HMD 100, ring artifacts could sometimes be observed in the pupil plane or eyebox 157 of the HMD. These ring artifacts, which are schematically indicated in FIG. 10 as concentric rings 337, can be in the form of polychromatic ring-shaped modulations that are superimposed over, or added to, an image being formed by the HMD. These ring artifacts may be due to finite polarization selection efficiency of PBP lenses and/or s-HWPs, causing polarization leakage whereby undesired polarization state leaks into a subsequent element of the stack. Leaking of undesired polarization states to subsequent polarization-selective elements and/or through a clean-up or output polarizer may create a non-uniform transmission pattern. We further discovered that the ring artifacts 337 can be substantially eliminated or at least reduced when using a switchable LC stack in which the first PBP lens receives unpolarized light FIG. 11 illustrates an example stack 510 of polarization selective elements receiving unpolarized light 401. In the context of this description, "unpolarized light" may refer to a light beam having a degree of polarization (DOP) of at most 30%, or preferably at most 10%. Stack 410 may be formed of a sequence of switchable lens pairs 320. In operation each of the PBP lenses of the stack, and each of the switchable lens pairs 320 thereof, outputs both LHCP and RHCP light beams, adding an optical power $D_1$ to one of the output light beams and subtracting the optical power $D_1$ from the other; here $D_1$ is the nominal optical power of the i-th PBP lens of the stack being considered. If unpolarized light 401 is collimated, one of the CP output beams diverges and the other converges. Generally, stack 410 switchably converts unpolarized image light 401 into two orthogonally polarized light beams 403, 402 having differing convergence characteristics. The conversion performed by the stack is switchable between a state where the stack adds optical power to the output RHCP beam while subtracting optical power from the output LHCP beam, and a state where the stack adds optical power to the output RHCP light beam while subtracting optical power from the output RHCP light beam. In embodiments where the unpolarized light 401 is collimated, the stack outputs a convergent light beam and a divergent light beam, as illustrated in FIG. 11 at 402 and 403 respectively, each of which being switchable between two orthogonal states of polarization. Thus stack 410 switchably converts unpolarized light it receives into two orthogonally polarized light beams 402 and 403. Each of these two orthogonally polarized light beams is switchable between two or more states of convergence, for example as described above with reference to FIG. 8 for a stack with three PBP lenses of differing optical power. The final CP selection may be made by the last s-HWP in the stack in cooperation with the output polarizer 322. Consecutive polarization-selective elements of the stack, such as the PBP lenses and the s-HWPs, may be in direct contact as shown in FIG. 11, or they may be spaced apart from each other. In some embodiments, the output polarizer 322 may be a part of the stack, for example the last element thereof in the direction of beam propagation. In some embodiments the output polarizer 322 may be external to the stack.

In some embodiments the number of PBP lenses in the stack 410 may differ from the number of s-HWPs. Some embodiments of stack 410 may combine one or more active, i.e. switchable, PBP lenses with switchable HWPs. An active LC PBP lens may be switched to a neutral state, in which it does not affect the optical power of the system and does not change the polarization of light passing through the lens. In its active state, an active LC PBP lens adds optical power to the system for CP light of one handedness, and subtracts optical power from the system for CP light of the opposite handedness. PBP lenses that add optical power when receiving LHCP light may be referred to as LH PBP lenses, and PBP lenses that add optical power when receiving RHCP light may be referred to as RH PBP lenses.

Figure 12A:
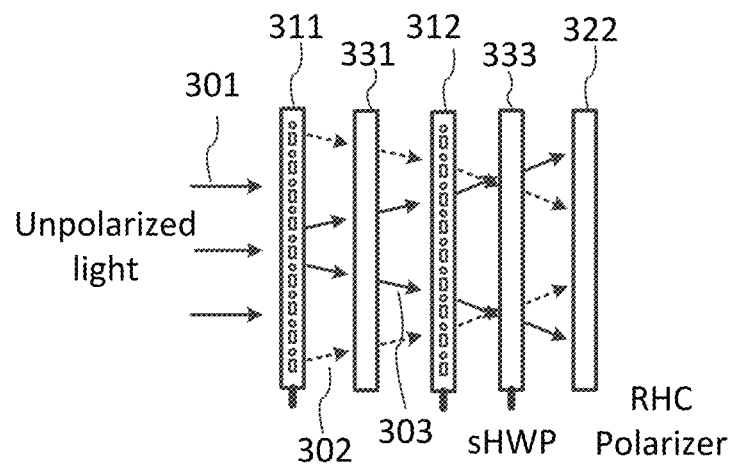
FIG. 12A is a schematic diagram of a switchable PBP stack with active PBP elements of a same handedness separated by a passive HWP.
Figure 12B:
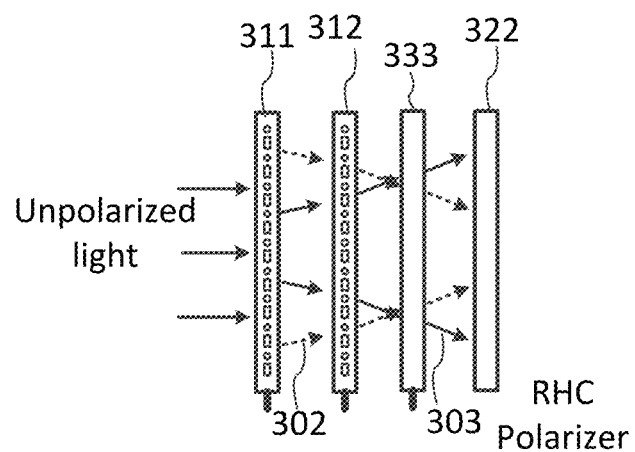
FIG. 12B is a schematic diagram of a switchable PBP stack with active PBP elements of opposite handedness stacked in a direct sequence.

FIGS. 12A and 12B illustrate example switchable stacks including two active PBP lenses, 311 and 312, followed by an s-HWP 333 and a CPr 322 in sequence. The first active PBP lenses 311 may have a nominal optical power D1, e.g. 1 D, while the second active PBP lenses 312 may have a nominal optical power D2, e.g. 0.5 D. In FIG. 12A, the first and second PBP lenses 311, 312 are of a same handedness, e.g. both being LH PBP lenses, and the stack includes a passive HWP disposed between the two PBP lenses for converting circular polarizations passed through the first PBP lens 311 back to its input handedness prior to entering the second PBP lens 312. A passive HWP between two active PBP lenses may not be needed however if consecutive PBP lenses are of opposite handedness, i.e. where an RH PBP lens is immediately followed or preceded by an LH PBP lens. In FIG. 12B, the second active PBP lens 312 has the opposite handedness of the first PBP lens 311, e.g. it may be a RH PBP lens if the first PBP lens 311 is a LH PBP lens; accordingly, the passive HWP 331 between the two PBP lenses 311, 312 is omitted in FIG. 12B.

When both active PBP lenses 311, 312 are in the neutral state, each of the stacks shown in FIGS. 12A and 12B acts substantially as a CP polarizer for input unpolarized light 301, with a zero total optical power. When both active PBP lenses 311, 312 are in their active state, the output s-HWP 333 receives two CP beams 302, 303 that have opposite handedness and different convergence/divergence beam characteristics, one with an added positive optical power of (D1+D2), e.g. 1.5 D, and another with an added negative optical power of −(D1+D2), e.g. −1.5 D. By switching the output s-HWP 333 on and off, the total optical power of the stack is switched between +(D1+D2) and −(D1+D2). When one of the active PBP lenses 311 and 312 is in its active state while the other is in its passive state, the total optical power of the stack may be switched by the output s-HWP 333 between +\−D2 if the first active PBP lens 311 is in its neutral state, e.g. +\−0.5 D, or between +/−D1 if the second active PBP lens 312 is in its neutral state, e.g. between +\−1 D. Thus, each of the stacks shown in FIGS. 12A and 12B may operate as a varifocal lens with its optical power switchable between 7 different sates, (−D1+D2), −D1, −D2, 0, +D2, +D1, and +(D1+D2), when D1 D2. The number of states with different optical powers that the stacks may be switched between may be increased by adding PBP lenses to the stack and, if the PBP lenses are of the same handedness, with additional HWPs following or preceding them.

Figure 13:
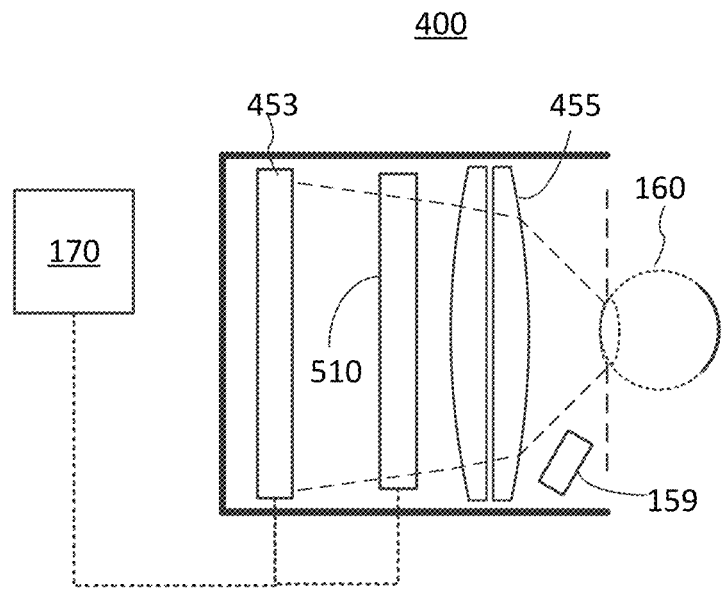
FIG. 13 is a schematic side cross-sectional view of an HMD using the switchable PBP lens stack of FIG. 11 coupled to an electronic display emitting unpolarized image light.

Referring to FIG. 13, there is illustrated an example wearable display system or HMD 400 utilizing a switchable LC stack 510. The switchable LC stack 510 may be embodied, for example, as described above with reference to FIGS. 11-12B, to be operable as a varifocal lens, and may lack an input polarizer so as to receive unpolarized light. In FIG. 12, elements functionally same or similar to those described above with reference to FIGS. 6 to 12B are indicated with the same reference numerals. HMD 400 may be viewed as an embodiment or modification of HMD 100, in which an electronic display 453 emits unpolarized light, and the optics block includes a pancake lens 455 disposed downstream of the switchable LC stack 510. HMD 400 may include other optical elements in place or additionally to the pancake lens 455 as described above with reference to optical block 155. It was observed that removal of an input polarizer upstream of a first PBP lens of the stack 510, so that the switchable LC stack 510, or at least the first PBP element thereof, receives unpolarized image light from display 453, substantially eliminates the appearance of ring artifacts at the eyebox.

Figure 14:
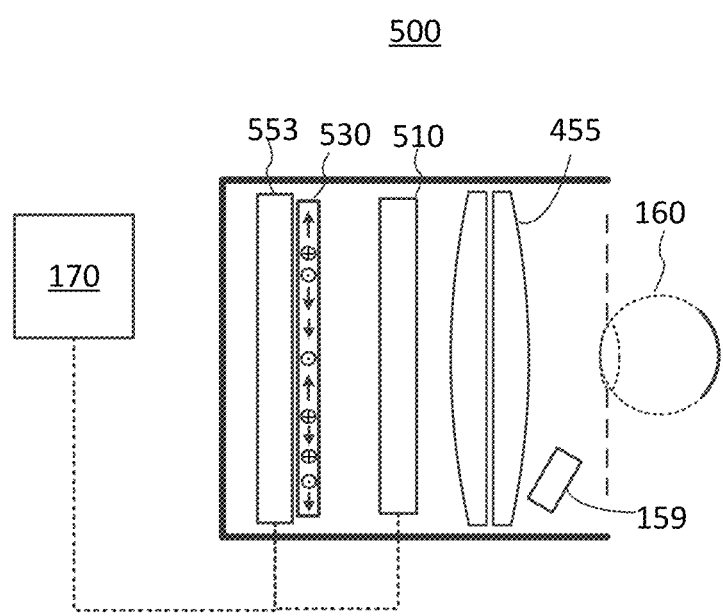
FIG. 14 is a schematic side cross-sectional view of an HMD having a depolarizer disposed between a switchable PBP lens stack and an electronic display emitting polarized image light.
Figure 15:
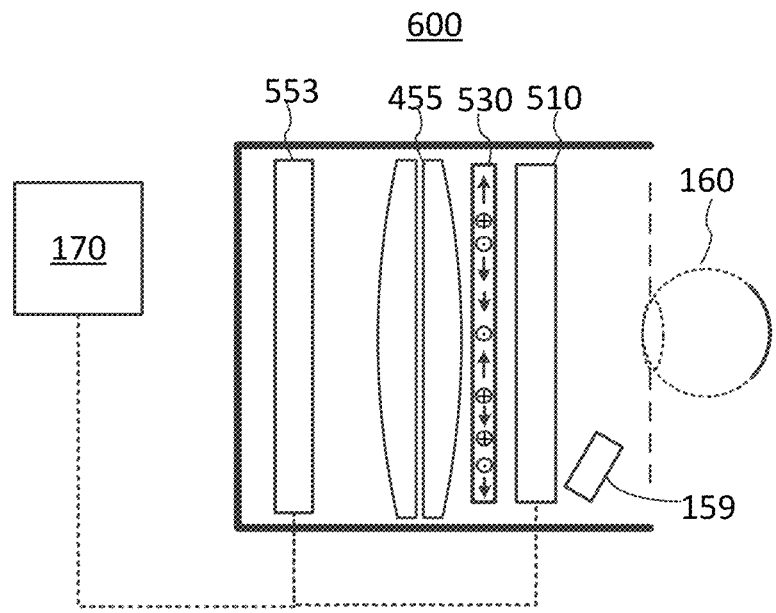
FIG. 15 is a schematic side cross-sectional view of an HMD having a depolarizer disposed downstream of a pancake lens and upstream of a switchable PBP lens stack.

Referring to FIG. 14, there is illustrated a wearable display system or HMD 500 having an electronic display 553 that emits image light that is linearly polarized. An example is an LC-based electronic display in which light is modulated substantially by controlling its polarization, and which therefore typically outputs polarized light. In such embodiments, a depolarizer 530 may be provided upstream of the switchable LC stack 510 to de-polarize the polarized light from the display. In some embodiments where the polarization of the image light emitted by the display is linear, depolarizer 530 may be configured specifically to depolarize linearly polarized light. In embodiments where the polarization of the image light emitted by the display is circular, depolarizer 530 may be configured specifically to depolarize CP light. It was observed that the addition of the depolarizer 530 in the optical path between display 553 and the first PBP lens of the switchable LC stack 510, so that the switchable LC stack 510 receives unpolarized image light, substantially eliminates or at least lessens the ring artifacts. In FIG. 14, elements functionally similar to those described above with reference to FIGS. 6 to 12 are indicated with the same reference numerals. It will be appreciated that the HMD architecture shown in FIG. 13 allows for various modifications. For example, in some embodiments the optics block of the HMD may include other optical elements in addition to those shown in FIG. 14. In some embodiments the shown optical elements or devices may be disposed in a different order. FIG. 15 illustrates an example embodiment 600 of HMD 500 in which the depolarizer 530 and the switchable LC stack 510 are disposed downstream of the pancake lens 455.

Figure 16:
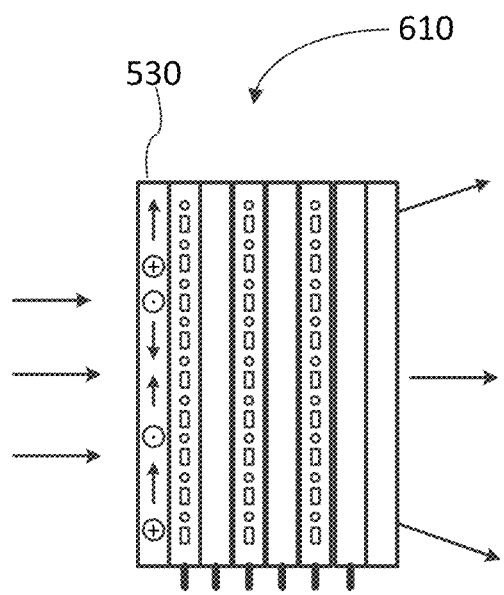
FIG. 16 is a schematic cross-sectional view of a switchable PBP lens stack including an input depolarizer.

In some embodiments, the depolarizer 530 may be included in a switchable LC stack, such as stack 510 or 410 described above, and may form an integrated block 610 therewith as illustrated in FIG. 16. In some embodiments, a depolarizer may be a separate element. In some embodiments a depolarizer may be laminated on another component of the HMD, for example upon the pixelated face of display 553 that emits polarized image light.

In embodiments where depolarizer 530 operates as a diffusor that spatially perturbs the optical phase of light passing therethrough in a random or quasi-random fashion, it may be preferable to position the depolarizer proximate to display 553. In some embodiments the depolarizer may be positioned at a distance d from the display where each location receives image light emitted by at most only a few, for example four, neighboring pixels, e.g. pixels immediately adjacent to each other. In some embodiments the depolarizer-display distance $d \leq p \cdot \cot(\beta)$, where p is the pixel pitch and $\beta$ is one half of an emitting angle of a pixel. In some embodiments the depolarizer may be placed in a direct contact with the pixelated face of display 553, e.g. a liquid crystal display panel or an LED array panel. In some embodiments the depolarizer may be laminated onto the display 553. In some embodiments layers of the switchable LC stack 510 may be laminated upon display 553 over the depolarizer.

Figure 17:
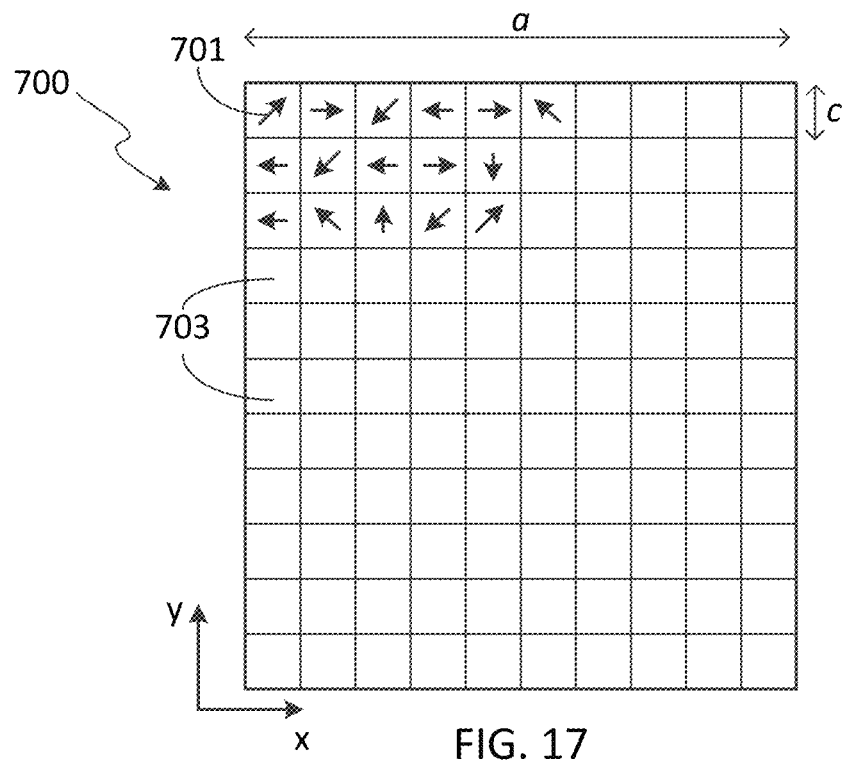
FIG. 17 is a schematic diagram illustrating a waveplate with spatially varying in-plane optic axis orientation for operating as a depolarizer.

FIG. 17 schematically illustrates an example depolarizer 700 that may be used as depolarizer 530 in some embodiments of the present disclosure. Depolarizer 700 may be in the form of, or include, a waveplate having a birefringent layer of some retardance Q in which the in-plane orientation of its optic axis 701, as described for example by its azimuth angle in the plane of the layer, spatially varies across the waveplate. In some embodiments the azimuth angle of the optic axis 701 changes randomly, pseudo-randomly, or in accordance with some suitable function or rule, by up to +\−90° and more across an area of the waveplate that is several times smaller than the total operating area of the waveplate. In some embodiment a length l over which the optic axis 701 may rotate by at least 90 degrees may be at least 2 times smaller, and preferably 5-10 times smaller than the size a of an operating area of the waveplate in at least one direction across the waveplate, e.g. either in x-axis or the y-axis directions illustrated in the figure. In some embodiment the length l, which may be referred to as the correlation length, may be at least 2 times smaller, and preferably 5-10 times smaller than the size of the operating area of the waveplate in any direction across the waveplate. Here the operating area of a waveplate is an area that is illuminated by a beam of light on which the waveplate operates. In some embodiments, for example when the depolarizer 700 is placed adjacent or close to an electronic display, such as electronic display 553 of the display system 500, the correlation length l of the optic axis of depolarizer 700 may be smaller than a pixel size b of the display, for example 2-5 times smaller, so that light from each pixel of the display assumes a range of polarization states and gets depolarized.

Depolarizer 700 may be formed with a layer of birefringent material of uniform in-plane birefringence and same retardance Q across the layer. In some embodiments depolarizer 700 may be configured for depolarizing linearly polarized light. In some embodiments the retardance Q corresponds to a half-wave retardance, so that depolarizer 700 is a HWP with a spatially varying in-plane optic axis orientation. In some embodiments the in-plane spatial variation of the optic axis orientation may be random or pseudorandom, with an in-plane correlation length l at least 5 times smaller than a characteristic size a of the operating area of the depolarizer, i.e. its size in each x- and y-in-plane dimensions or an expected diameter of the incident light beam. In some embodiments the in-plane correlation length l may be at least 2 times smaller than a pixel size b of an electronic display to which the depolarizer is coupled. In some embodiments the in-plane correlation length l may be at least 5 times smaller than a pixel size b of an electronic display to which the depolarizer is coupled. Embodiments in which the orientation of the optic axis 701 varies in somewhat regular manner across the waveplate may also be envisioned, although may result in the appearance of visual artifacts in some circumstances.

In some embodiment depolarizer 700 may be in the form of an LC waveplate, such as an LC HWP, with the in-plane orientation of its optic axis 701, as may be defined by the LC director's orientation, varying spatially in the plane of the LC layer. In some embodiments this variation may be random or pseudorandom in either in-plane direction of the LC layer, with a size c of an area segment 703 playing the role of the optic axis correlation length l. In some embodiments the LC waveplate may be comprised of a plurality of area segments 703 which have substantially the same retardance, e.g. that of a HWP, but differing in-plane orientation of the optic axis or LC director 701. In some embodiments the in-plane orientation of the optic axis varies randomly or pseudo-randomly from one area segment 703 to the next. In the context of this description the term "pseudorandom" refers to a statistical process that may be emulated using a computer-implemented pseudo-random number generator. In some embodiments the LC layer comprises nematic LC material. In some embodiments the nematic LC material may be twisted nematic LC for broad-spectrum operation. In some embodiment the LC layer may be stabilized by a polymer network.

In some embodiments the following "phase-randomizing" condition may be satisfied $$|\Sigma_1^N \vec{e}_i| \leq 1/N,$$

where N is the number of area segments across the operating area of the waveplate in either in-plane dimension (i.e. along the x-axis or the y-axis, or along any diameter of a circular waveplate), and $\vec{e}_i$ is an in-plane vector of unit length which direction corresponds to a characteristic in-plane direction of the optic axis of an i-th area segment 701. In some embodiment the size c of an area segment 703 may be smaller than the pixel pitch p of an electronic display to which the depolarizer is coupled when placed adjacent to the electronic display. In some embodiment the size c of an area segment 703 may be at least 2 times smaller than the pixel pitch p. In some embodiment the size c of an area segment 703 may be at least 5 times smaller than the pixel pitch p.

Figure 18:
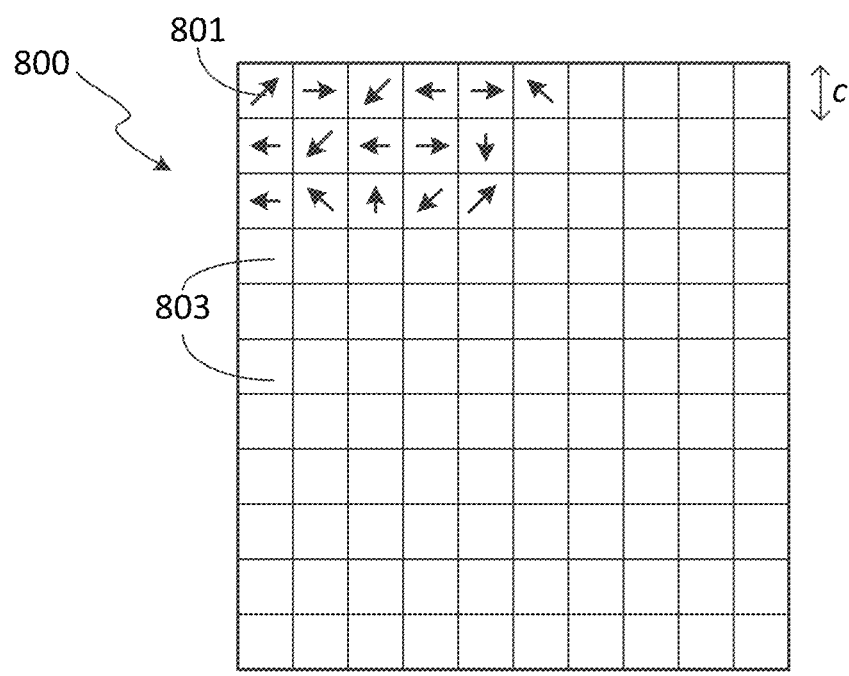
FIG. 18 is a schematic diagram illustrating an LC alignment layer with spatially varying alignment direction for use in an LC depolarizer.

Referring to FIG. 18, the LC depolarizer 700 may be fabricated by optionally depositing an alignment layer 800 of a photo-alignable material on a substrate, such as substrate 30 illustrated in FIG. 1, and exposing the alignment layer 800 to UV light having spatially varying polarization in order to align molecules of the alignment layer in a spatial varying direction as described above. In some embodiments the polarized UV beam may be focused upon an area segment 803 of the alignment layer 800 so as to align the material of the alignment layer in an alignment direction 801 defined by the polarization of the UV beam. The UV beam may then be stepped from segment to segment across the alignment layer, changing its polarization for each step in a random or pseudo-random fashion, so as to form an array of area segments 803 of the alignment layer 800 having a random or pseudorandom orientation of the alignment direction 801. In some embodiments, a mask may be stepped and used to pseudo-randomly vary the linear polarization of the UV beam and/or the exposure area while the beam polarization in varied, or more generally a polymerizing beam at a polymerizing wavelength. Next, a layer of LC material may be deposited, for example spun-coated, upon the alignment layer 800, with the LC director aligning in each area segment 803 along the alignment direction 801 in that segment. In some embodiments the LC material may then be polymerized, for example in presence of nitrogen under UV light, to fix the LC direction orientation in the random or pseudo-random pattern. In some embodiments a second substrate may be optionally affixed to the first substrate to cover the LC layer. In some embodiments the LC material comprises nematic LC. In some embodiments the LC material comprises chiral or twisted nematic LC. In some embodiments the pitch of the chiral LC material of the LC layer, i.e. the distance it takes for the LC director to rotate one full turn in the helix in the direction normal to the LC layer, may be selected for providing an HWP retardance for visible light. In some embodiments chiral dopants or chiral materials may be added to the LC material.

Figure 19:
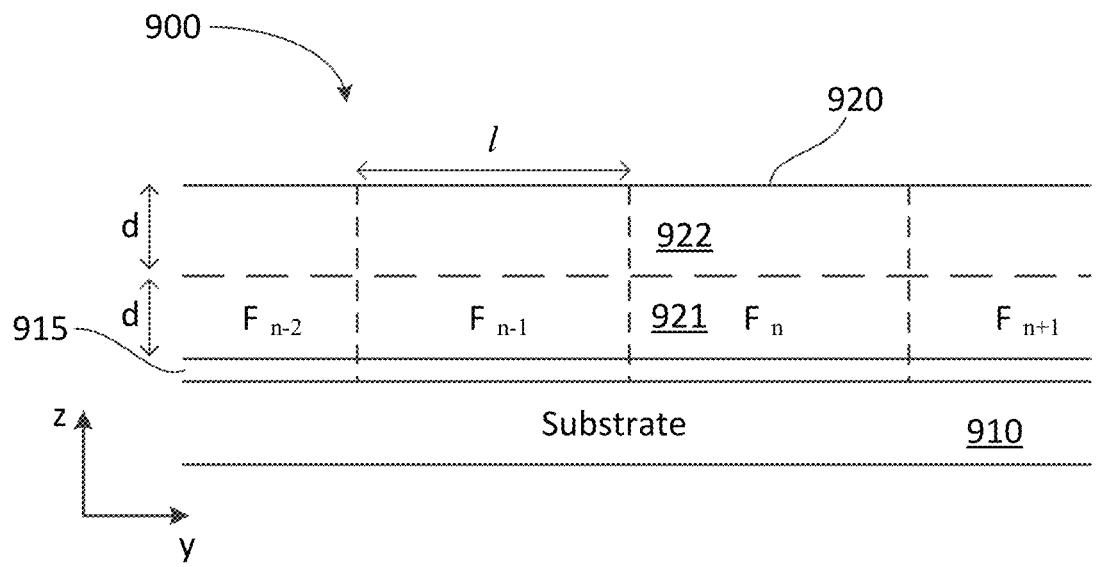
FIG. 19 is a schematic cross-sectional view of a depolarizer formed with an LC bilayer having antisymmetric twist and spatially randomized optic axis in the plane of the waveplate.
Figure 20A:
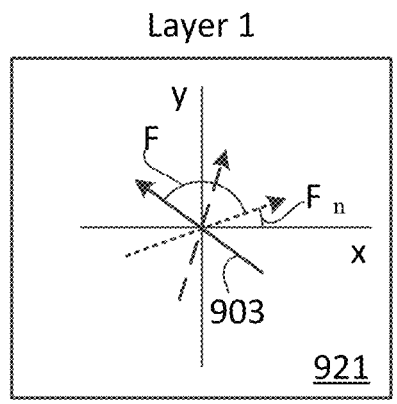
FIG. 20A is a schematic plan view of one depolarizer segment illustrating the LC director twist in a lower layer of the LC bilayer; the LC director at the top of the layer is shown with a solid arrow.
Figure 20B:
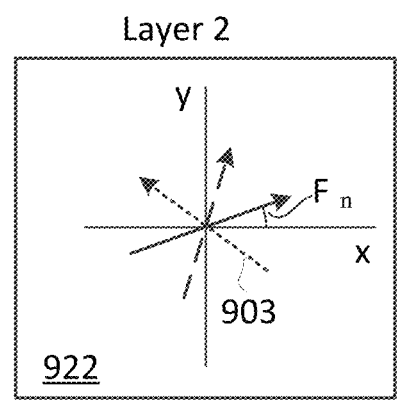
FIG. 20B is a schematic plan view of the depolarizer segment of FIG. 20A illustrating the LC director twist in the second layer of the LC bilayer; the dotted arrow illustrates the LC director at the bottom of the layer at the boundary with the lower layer.

Referring to FIGS. 19, 20A, and 20B, in some embodiments a retardation compensation method may be used to provide the HWP operation in a broad wavelength range, e.g. across the RGB spectrum. In accordance with an embodiment of the method, a broad-band depolarizer 900 may comprise a depolarizing bilayer 920 disposed over an optional substrate 910. The depolarizing bilayer 920 may be flat or curved, and may be formed of two depolarizing layers 921, 922 of chiral liquid crystal stacked on top of each other. The LC director of each layer is indicated at 903 in FIGS. 20A and 20B in projection on the plane of the layers. The first layer 921 has the LC director 903 (FIGS. 20A, 20B) with a first sense of twist in a thickness direction, wherein the thickness direction is normal to the substrate 910 (the z-axis direction in FIG. 19). The second layer 922 of the twisted LC material is disposed over the first layer 921, with the LC director 903 having a second sense of twist in the thickness direction, wherein the second sense of twist in the second layer is opposite to the first sense of twist in the first layer. The lower layer 921 may be disposed over an alignment layer 915 and an optional substrate 910 that may be optically transparent. The LC director 903 of the first layer at a particular distance from the substrate 910, for example at an interface with the second layer 922 as schematically illustrated with a solid arrow in FIG. 20A, has a direction that varies randomly or pseudo-randomly in the plane of the substrate (x,y). The alignment layer 915 may be randomly photoaligned, for example as described above with reference to FIG. 18. The orientation of the LC director 903 in a vertical (x,z) cross-section of an n-th segment of depolarizer 900 (FIG. 19, the LC director not shown) may be described by an azimuth angle φ(n,x,z) that may vary according to equation (2):

$$\phi(n, x, z) = \begin{cases} \Phi_n + \Phi z/d & \text{if } 0 \le z \le d \\ \Phi_n + \Phi\left(2 - \dfrac{z}{d}\right) & \text{if } d < z \le 2d \end{cases} \quad (2)$$

Here d is the thickness of each depolarizing layer 921, 922, T is an azimuth angle of the LC director in the first depolarizing layer 921 at the border with the alignment layer 915 in the n-th area segment of depolarizer 900, and may be referred to as a base angle of the LC director of n-th segment. The base angle values $\{\Phi_n\}$ may form a random or pseudo-random set with a uniform probability distribution across a 180 degrees range.

FIGS. 20A and 20B schematically illustrate, in a plan view, the orientation of the LC director 903 in an n-th segment at different distances from the alignment layer 915. In FIG. 20A, the orientation of the LC director 903 is schematically shown with a dotted arrow at the border with the alignment layer 915, with a dashed arrow in the middle of the first layer 921, and with a solid arrow at the border with the second depolarizing layer 922. In FIG. 20B, the orientation of the LC director 903 is schematically shown with a dotted arrow at the border with the first depolarizing layer 921, with a dashed arrow in the middle of the second depolarizing layer 922, and with a solid arrow at the top surface of the second depolarizing layer 922. Thus, in this example the LC director 903 in the first layer 921 and the second layer 922 have opposite twist sense and equal absolute value of the twist angle 1 in each layer, with the total twist angle across two layers of zero. The first and second layers 921, 922 may each have the thickness of a half-wave plate in the wavelength range of operation, providing a total retardation of a HWP for the bilayer 920.

The opposite twist sense along the layer thickness may be obtained by adding chiral dopants of opposite chirality to a curable polymeric liquid crystal mixture (CPLCM). Chiral dopants that have right-handed (RH) chirality may be used to form one layer, and chiral dopants that have left-handed (LH) chirality may be used to form the other layer. The process may include depositing a linear photopolymerizable polymer (LPP) onto a suitable substrate to form an alignment layer, recording a desired random or pseudo-random alignment pattern into the alignment layer, coating the alignment layer with a first CPLCM layer doped with suitable chiral molecules of a first chirality, for example RH, to form the first depolarizing layer 921, and depositing a second CPLCM layer doped with suitable chiral molecules of a second chirality, for example LH, over the first CPLCM layer to form the second depolarizing layer 922. In other embodiments dopants of LH chirality may be used for the first layer, and dopants of RH chirality for the second layer. Examples of suitable chiral dopants include chiral dopants R811 (right hand) and 5811 (left hand) that are available from Merck & CO., Inc. The degree of twist, or twist angle 1 in each layer, is determined by the layer thickness d and the pitch of the chiral LC solution, i.e. the distance it takes for the LC director to rotate one full turn in the helix in the direction normal to the LC layer. The chiral pitch (p) is related to the concentration (c) and helical twisting power (HTP) of the chiral dopant (p=1/(HTP*c).

It will be appreciated that other types of depolarizers may be used in NEDs and other compact display systems in conjunction with switchable LC stacks, including but not limited to LC based depolarizers, non-LC depolarizers, and depolarizers capable of depolarizing CP light. Furthermore many variations and modifications of example embodiments described above will be apparent to those of ordinary skill in the art from the foregoing description and accompanying drawings. For example, in some embodiments the switchable multi-layer LC stack operating with unpolarized incident light may include other PBP optical elements, such as PBP gratings (see e.g. FIG. 3B) in addition to, or instead of, the PBP lenses described above. For example, in some embodiments each PBP lens in the switchable stack 410 or 510 may be replaced with a polarization grating, such as a PBP grating, to provide a switchable image light shifter or deflector. Similarly, in some embodiments each active PBP lens in the example switchable stacks illustrated in FIGS. 12A, 12B may be replaced with an active polarization grating, such as an active LC PBP grating. In some embodiments using such switchable beam deflectors with unpolarized light may reduce visual artifacts, either circular or linear, which may occur due to polarization leaking. In some embodiments a de-polarizer may be used as a part of an HDM in front of a non-switchable LC stack that may include a polarizer or a polarization selector.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 21A:
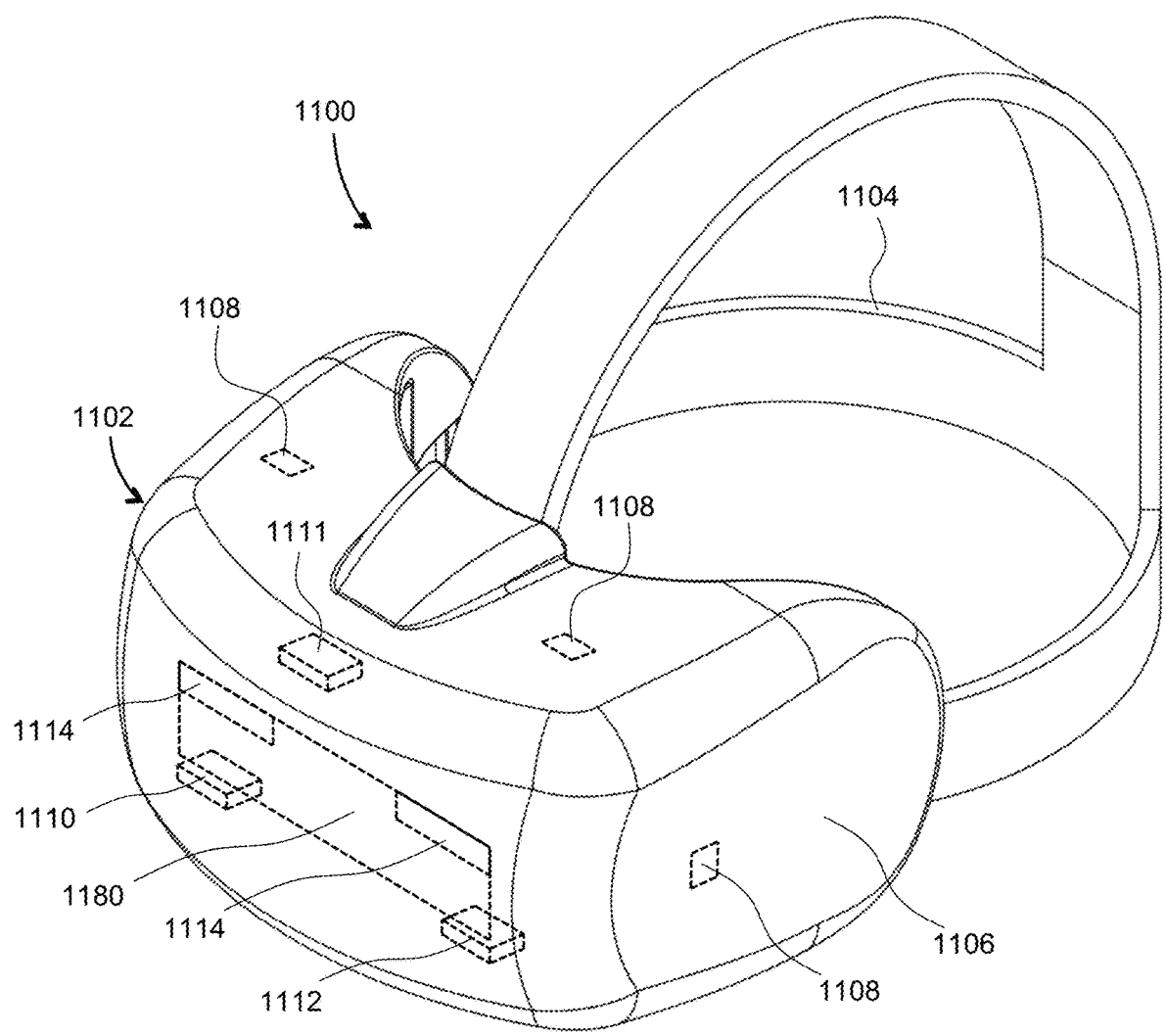
FIG. 21A is an isometric view of a head-mounted display of the present disclosure.

Referring to FIG. 21A, an HMD 1100 is an example of an AR/VR wearable display system which encloses the user's face, for a greater degree of immersion into the AR/VR environment. The HMD 1100 may be an embodiment of the wearable display system 400 of FIG. 13 or the wearable display system 500 of FIG. 14, for example. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation may help presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes may allow the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 21B:
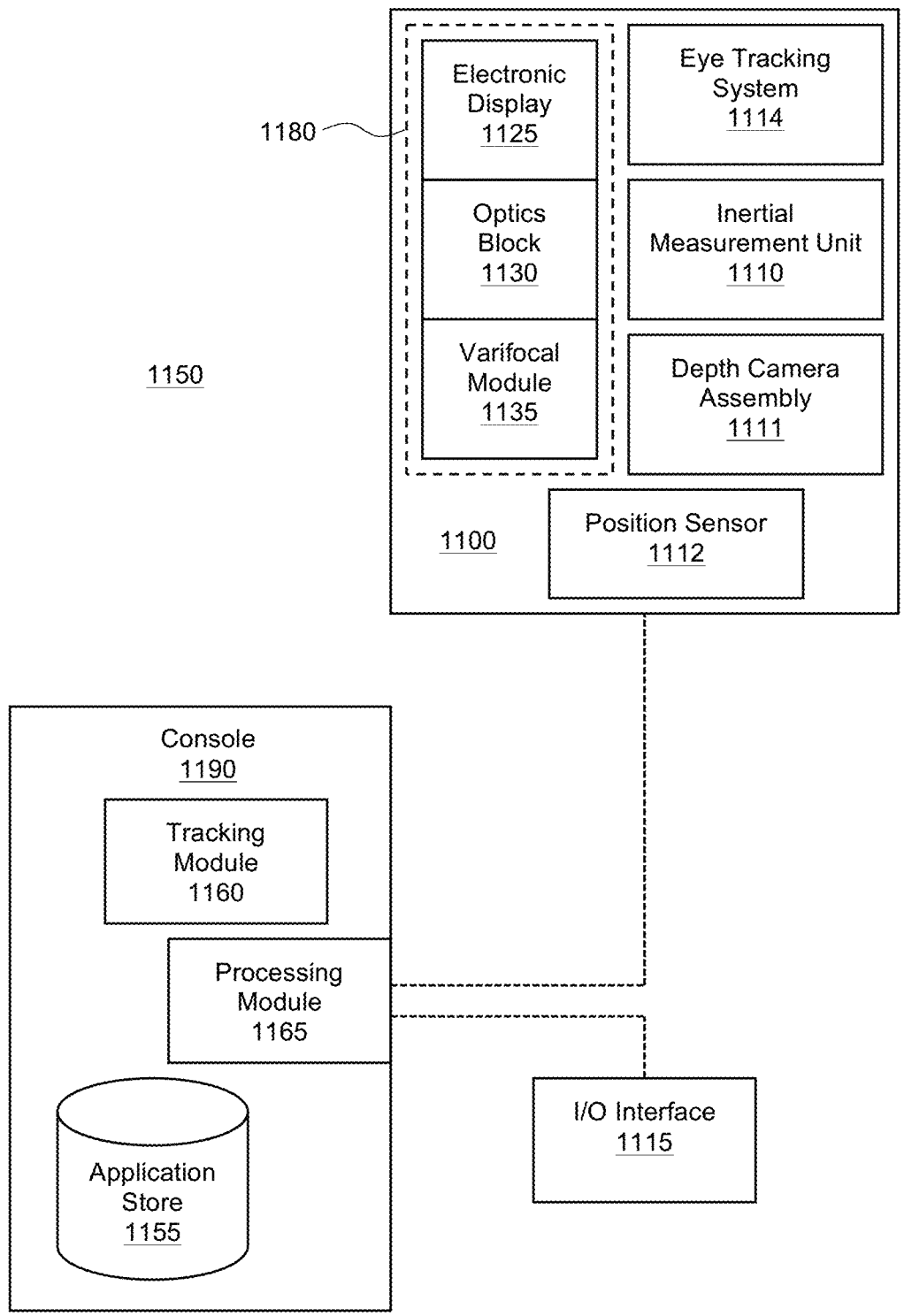
FIG. 21B is a block diagram of a virtual reality system including the headset of FIG. 21A.

Referring to FIG. 21B, an AR/VR system 1150 may be an example implementation of the wearable display system 400 of FIG. 13, the wearable display system 500 of FIG. 14, or the wearable display system 600 of FIG. 15. The AR/VR system 1150 includes the HMD 1100 of FIG. 21A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 21A and 21B may be distributed among the components in a different manner than described in conjunction with FIGS. 21A and 21B in some embodiments. For example, some or all of the functionality of the console 1190 may be provided by the HMD 1100, and vice versa. The HMD 1100 may be provided with a processing module capable of achieving such functionality.

As described above with reference to FIG. 21A, the HMD 1100 may include the eye tracking system 1114 (FIG. 21B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 21B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc. The varifocal module 1135 may be for example embodied with a switchable PBP lens stack such as those illustrated in FIGS. 11, 12A, 12B, 15, their variations and combinations, and may include a depolarizer in some embodiments.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 21B, the console 1190 includes an application store 1155, a tracking module 1160, and a processing module 1165. Some embodiments of the console 1190 may have different modules or components than those described in conjunction with FIG. 21B. Similarly, the functions further described below may be distributed among components of the console 1190 in a different manner than described in conjunction with FIGS. 21A and 21B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein, and various other embodiments and modifications will become evident to the skilled reader from the present disclosure. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. For example, embodiments described herein with reference to wearable display systems such as HMDs may also be implemented in other display systems, such as but not exclusively heads-up displays (HUDs) and heads-down displays. Accordingly, the claims set forth below should be construed in view of the full breadth and spirit of the present disclosure as described herein.

What is claimed is:

1. A display system comprising:
   a source of unpolarized image light;
   a stack of polarization-selective optical elements disposed to receive the unpolarized image light and operable to switchably convert the unpolarized image light into two orthogonally polarized light beams; and
   an output polarizer disposed to receive the two orthogonally polarized light beams and configured to select one of the two orthogonally polarized light beams for forming an image;
   wherein the stack comprises one or more Pancharatnam-Berry phase (PBP) optical elements, and wherein at least one of the one or more PBP optical elements is disposed to receive the unpolarized image light.

2. The display system of claim 1 configured to be mounted upon a user's head for near-eye display of images, wherein the stack is absent an input polarizer.

3. The display system of claim 1, wherein the stack comprises one or more switchable half-wave plates (HWP).

4. The display system of claim 3, wherein the one or more PBP optical elements comprise a plurality of PBP lenses of differing nominal optical power, and wherein the stack is configured to operate as a vary-focal lens.

5. The display system of claim 4, wherein the plurality of PBP lenses comprises a switchable liquid crystal (LC) PBP lens.

6. The display system of claim 4, wherein the plurality of PBP lenses comprises one or more passive PBP lenses, each followed by a switchable HWP.

7. The display system of claim 3, wherein the one or more PBP optical elements comprise a polarization grating.

8. The display system of claim 7, wherein the polarization grating is directly followed by a switchable HWP.

9. The display system of claim 7, wherein the polarization grating comprises an LC PBP grating switchable to a non-diffracting state.

10. The display system of claim 1, wherein the source of unpolarized image light comprises an electronic display configured to emit unpolarized light.

11. A display system comprising: a source of unpolarized image light comprising an electronic display configured to emit polarized image light, and a depolarizer disposed in an optical path between the electronic display and a stack of polarization-selective optical elements, the stack disposed to receive the unpolarized image light and operable to switchably convert the unpolarized image light into two orthogonally polarized light beams; and an output polarizer disposed to receive the two orthogonally polarized light beams and configured to select one of the two orthogonally polarized light beams for forming an image.

12. The display system of claim 11, wherein the polarized image light is linearly polarized, and wherein the depolarizer comprises a half-wave plate (HWP) with a spatially randomized in-plane optic axis.

13. The display system of claim 12, wherein the depolarizer is disposed adjacent to the electronic display.

14. The display system of claim 11, wherein the stack comprises a sequence of LC PBP optical elements, each paired with a switchable LC HWP.

15. The display system of claim 11, wherein at least one of the polarization-selective elements of the stack comprises a switchable LC PBP optical element.

* * * * *